US012420489B2

(12) United States Patent
Wi et al.

(10) Patent No.: US 12,420,489 B2
(45) Date of Patent: Sep. 23, 2025

(54) SEALING APPARATUS FOR SECONDARY BATTERY

(71) Applicant: LG Energy Solution, Ltd., Seoul (KR)

(72) Inventors: Yoon Bong Wi, Daejeon (KR); Eung Jin Jang, Daejeon (KR); Sin Young Park, Daejeon (KR); Tae Won Kang, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 96 days.

(21) Appl. No.: 18/017,966

(22) PCT Filed: Aug. 5, 2021

(86) PCT No.: PCT/KR2021/010310
§ 371 (c)(1),
(2) Date: Jan. 25, 2023

(87) PCT Pub. No.: WO2022/035124
PCT Pub. Date: Feb. 17, 2022

(65) Prior Publication Data
US 2023/0264430 A1    Aug. 24, 2023

(30) Foreign Application Priority Data

Aug. 11, 2020   (KR) .................. 10-2020-0100762

(51) Int. Cl.
*B29C 65/18*      (2006.01)
*B29C 65/00*      (2006.01)
(Continued)

(52) U.S. Cl.
CPC ............ *B29C 65/18* (2013.01); *B29C 66/433* (2013.01); *B29C 66/83221* (2013.01);
(Continued)

(58) Field of Classification Search
CPC . B29C 65/18; B29C 66/433; B29C 66/83221; B29C 66/346; B29C 66/3462;
(Continued)

(56) References Cited

U.S. PATENT DOCUMENTS

2002/0157242 A1   10/2002 Fukuda et al.
2014/0079967 A1*   3/2014 Kodama ............. H01M 10/052
                                                        429/61
(Continued)

FOREIGN PATENT DOCUMENTS

EP            3249732 A1    11/2017
JP         2019008954 A      1/2019
(Continued)

OTHER PUBLICATIONS

English machine translation of KR-20160133041-A (Year: 2016).*
(Continued)

*Primary Examiner* — S. Behrooz Ghorishi
(74) *Attorney, Agent, or Firm* — Lerner David LLP (57) ABSTRACT

A sealing apparatus for a secondary battery is disclosed, the sealing apparatus configured to seal a battery case of the secondary battery with an electrode assembly therein. The sealing apparatus comprises: a pair of sealing blocks which press the outer circumferential surface of the battery case; and a heating unit which is provided in the pair of sealing blocks and heat the pair of sealing blocks. The pair of sealing blocks comprise: lead sealing regions configured to press the lead sealing portion of the battery case; and case sealing regions configured to press the case sealing portion of the battery case. The heating unit heats the lead sealing regions and the case sealing regions of the pair of sealing blocks at different temperatures.

10 Claims, 6 Drawing Sheets

(51) Int. Cl.
  *B29L 31/00* (2006.01)
  *H01M 10/04* (2006.01)
  *H01M 50/188* (2021.01)

(52) U.S. Cl.
  CPC ..... *H01M 10/0409* (2013.01); *H01M 50/188* (2021.01); *B29L 2031/7146* (2013.01)

(58) Field of Classification Search
  CPC .......... B29C 66/81425; B29C 66/3472; B29C 66/91423; B29C 66/1122; B29C 66/81431; B29C 66/81463; B29C 66/81821; B29C 66/8242; B29C 66/92451; B29C 66/82; H01M 10/0409; H01M 50/188; H01M 50/116; H01M 50/543; H01M 50/105; H01M 50/553; B29L 2031/7146; B29L 2031/3468; Y02E 60/10
  See application file for complete search history.

(56) References Cited

U.S. PATENT DOCUMENTS

| | | |
|---|---|---|
| 2014/0090780 A1 | 4/2014 | Jeong |
| 2018/0047950 A1 | 2/2018 | Lim et al. |
| 2018/0190951 A1 | 7/2018 | Kim et al. |
| 2020/0044229 A1 | 2/2020 | Yanagi |

FOREIGN PATENT DOCUMENTS

| | | |
|---|---|---|
| KR | 100676989 B1 | 1/2007 |
| KR | 100822190 B1 | 4/2008 |
| KR | 20080034223 A | 4/2008 |
| KR | 20120063236 A | 6/2012 |
| KR | 20120126932 A | 11/2012 |
| KR | 20140015647 A | 2/2014 |
| KR | 20140032701 A | 3/2014 |
| KR | 20140041057 A | 4/2014 |
| KR | 20150063658 A | 6/2015 |
| KR | 20150071918 A | 6/2015 |
| KR | 20160133041 A | 11/2016 |
| KR | 20170058262 A | 5/2017 |
| KR | 20190082309 A | 7/2019 |
| KR | 20200059616 A | 5/2020 |
| WO | 2001054985 A1 | 8/2001 |

OTHER PUBLICATIONS

Extended European Search Report for Application No. 21856130.6 dated Dec. 21, 2023. 8 pgs.
International Search Report for PCT/KR2021/010310 mailed Nov. 23, 2021. 3 pgs.

* cited by examiner

FIG.6

SEALING APPARATUS FOR SECONDARY BATTERY

CROSS-REFERENCE TO RELATED APPLICATIONS

This application is a national stage entry under 35 U.S.C. § 371 of International Application No. PCT/KR2021/010310, filed on Aug. 5, 2021, which claims priority to Korean Patent Application No. 10-2020-0100762, filed on Aug. 11, 2020, the entire contents of which are incorporated herein by reference in their entireties.

TECHNICAL FIELD

The present invention relates to a sealing apparatus for a secondary battery.

BACKGROUND ART

Secondary batteries are rechargeable unlike primarily batteries, and also, the possibility of compact size and high capacity is high. Thus, many studies on secondary batteries are being carried out recently. As technology development and demands for mobile devices increase, the demands for secondary batteries as energy sources are rapidly increasing.

Secondary batteries are classified into coin type batteries, cylindrical type batteries, prismatic type batteries, and pouch type batteries depending on a shape of a battery case. In such a secondary battery, an electrode assembly mounted to the inside of a battery case is a chargeable and dischargeable power generating element having a structure in which an electrode and a separator are stacked.

The electrode assembly may be generally classified into: a jelly-roll type in which a separator is interposed between a positive electrode and a negative electrode, each of which has the form of a sheet coated with an active material, and then wound; a stacked type in which a plurality of positive and negative electrodes are sequentially stacked with separators therebetween; and a stack/folding type in which stacked type unit cells are wound together with a separation film having a long length.

Meanwhile, when a secondary battery according to the related art is manufactured, an electrode assembly is accommodated in a pouch. Then, outer circumferential surfaces of the pouch are pressed and heated from the top and bottom sides by a sealing tool, and then sealed.

Here, in a sealing portion of the pouch, heat loss occurs due to an electrode lead at a region in which the electrode lead is located between the pouch. Thus, the temperature at the region becomes lower than in a region in which only the pouch is located without the electrode lead. Also, accordingly, the temperature of a portion of the sealing tool, which presses the region of the sealing portion in which the electrode lead is located, becomes locally lower.

Thus, since the sealing portion is not sealed at the uniform temperature, it is difficult to ensure the uniform sealing quality.

PRIOR ART DOCUMENTS (Patent Document 1) Korean Patent Publication No. 10-2014-0015647

DISCLOSURE OF THE INVENTION

Technical Problem

One aspect of the present invention is to provide a sealing apparatus for a secondary battery, which is capable of ensuring the uniform sealing quality.

Technical Solution

A sealing apparatus for a secondary battery according to an embodiment of the present invention is a sealing apparatus for sealing a battery case, which accommodates an electrode assembly therein, to manufacture the secondary battery. The secondary battery comprises an electrode lead which is connected to the electrode assembly and extended to the outside of the battery case, and the battery case comprises: a lead sealing portion in which the electrode lead is located in a pressing direction at an outer circumferential surface; and a case sealing portion in which only the battery case is located. The sealing apparatus comprises: a pair of sealing blocks which press the outer circumferential surface of the battery case; and a heating unit which is provided in the pair of sealing blocks and heat the pair of sealing blocks. The pair of sealing blocks comprise: lead sealing regions configured to press the lead sealing portion of the battery case; and case sealing regions configured to press the case sealing portion of the battery case. The heating unit may heat the lead sealing regions and the case sealing regions of the pair of sealing blocks at different temperatures.

Meanwhile, a secondary battery according to an embodiment of the present invention may be manufactured through the sealing apparatus for a secondary battery according to an embodiment of the present invention.

Advantageous Effects

According to the present invention, the battery case is pressed and heated through the pair of sealing blocks, and the pair of sealing blocks are heated through the heating unit when sealing. The lead sealing regions for pressing the portion of the battery case in which the electrode lead is located and the case sealing regions for pressing the portion in which only the battery case is located are heated at different temperatures. Thus, the uniform sealing quality may be ensured.

Here, the heating unit performs heating such that the temperatures of the lead sealing regions are higher than the temperatures of the case sealing regions in the pair of sealing blocks. Thus, the temperatures of the lead sealing regions may be prevented from becoming relatively lower than the temperatures of the case sealing regions due to the heat loss by the electrode lead. Therefore, the pair of sealing blocks are maintained at the uniform temperature, and thus the uniform sealing quality may be easily ensured.

MODE FOR CARRYING OUT THE INVENTION

The objects, specific advantages, and novel features of the present invention will be more clearly understood from the following detailed description and preferred embodiments taken in conjunction with the accompanying drawings. In the specification, when reference numerals are given to elements in each drawing, it should be noted that the same elements will be designated by the same reference numerals if possible although they are shown in different drawings. However, the present invention may be embodied in various different forms, and is not limited to the embodiments described herein. Also, in describing the present invention, detailed description related to well-known functions will be omitted so as not to unnecessarily obscure subject matters of the present invention.

Sealing Apparatus for a Secondary Battery According to an Embodiment

Figure 1:
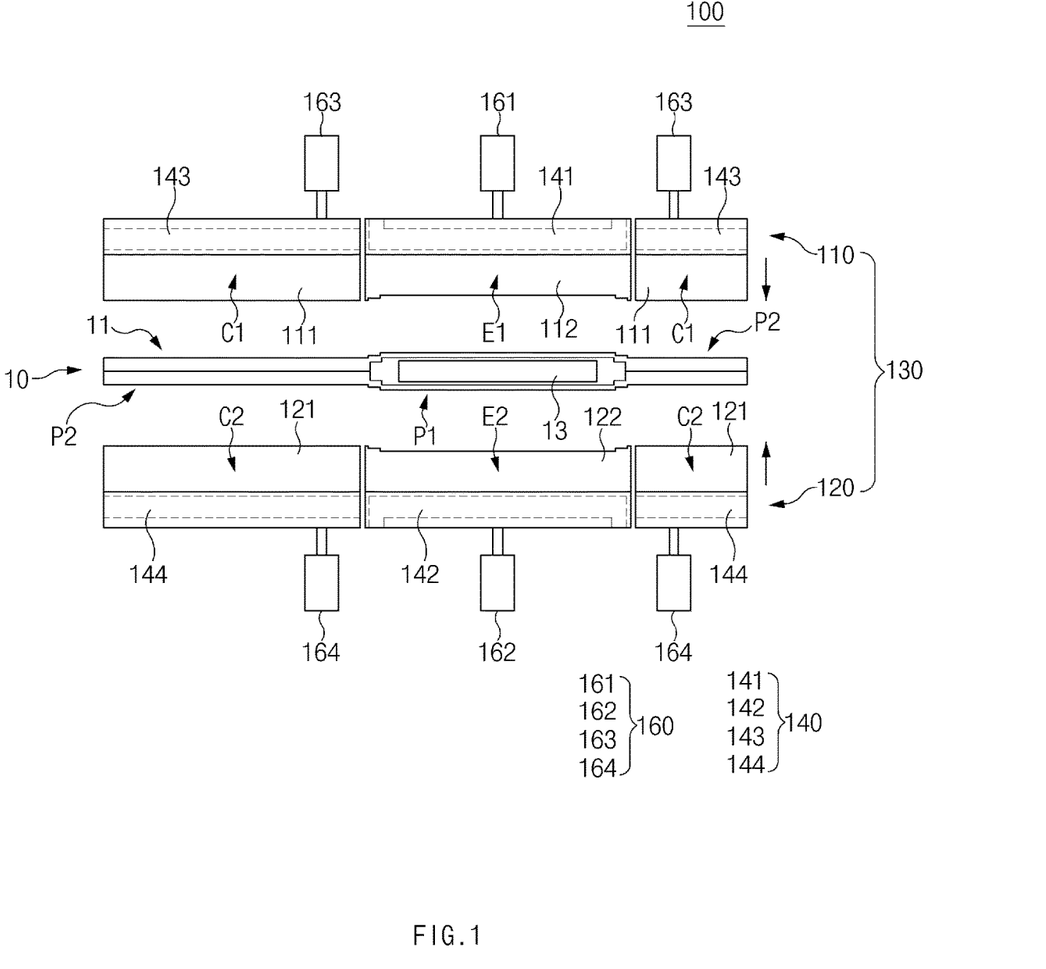
FIG. 1 is a front view exemplarily showing a sealing apparatus for a secondary battery according to an embodiment of the present invention.
Figure 2:
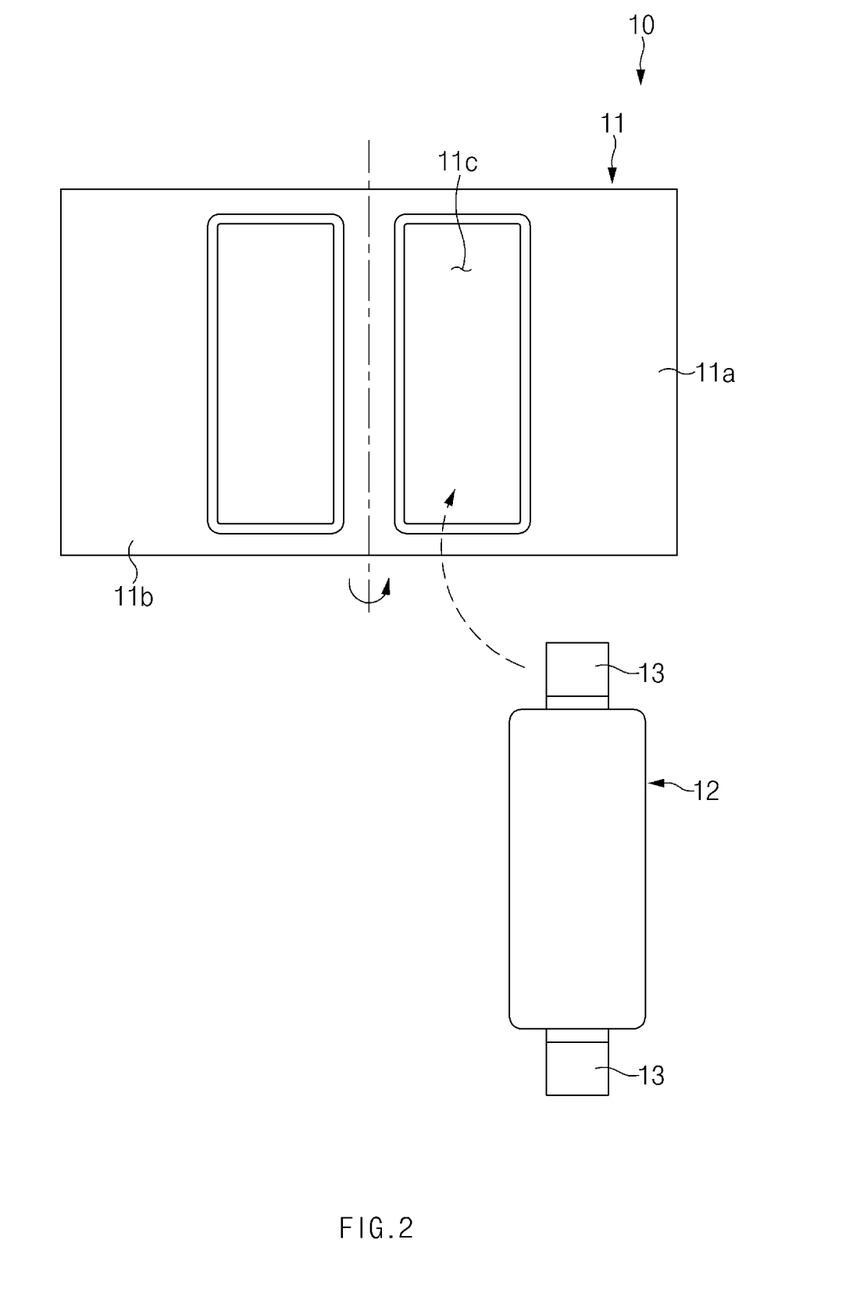
FIG. 2 is an exploded plan view of a secondary battery applied in a sealing apparatus for a secondary battery according to an embodiment of the present invention.
Figure 3:
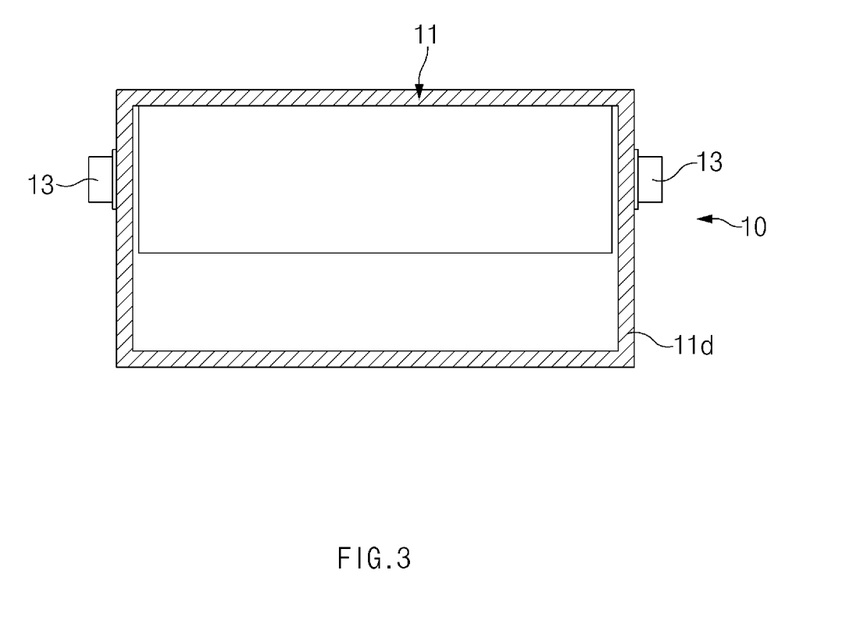
FIG. 3 is a plan view showing a secondary battery applied in a sealing apparatus for a secondary battery according to an embodiment of the present invention.
Figure 4:
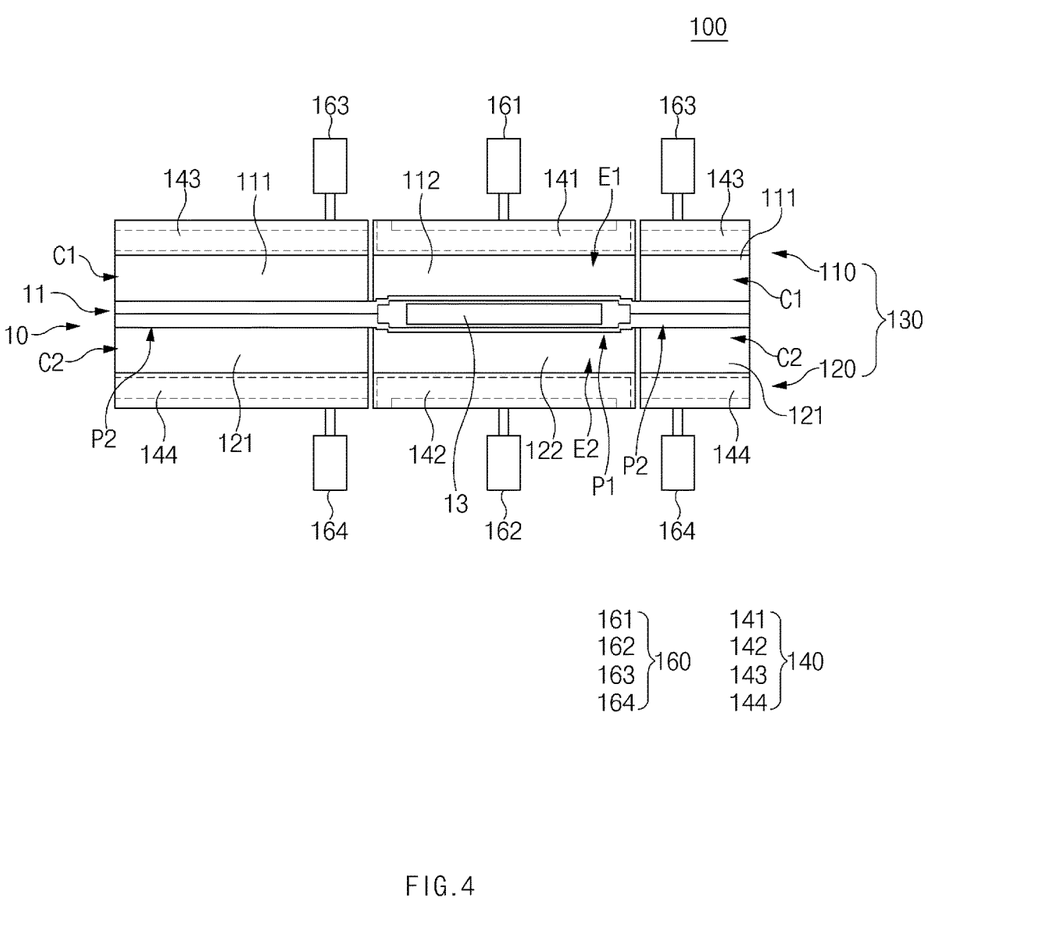
FIG. 4 is a front view showing a state in which a secondary battery is pressed by a sealing apparatus for a secondary battery according to an embodiment of the present invention.

FIG. 1 is a front view exemplarily showing a sealing apparatus for a secondary battery according to an embodiment of the present invention, FIG. 2 is an exploded plan view of a secondary battery applied in a sealing apparatus for a secondary battery according to an embodiment of the present invention, FIG. 3 is a plan view showing a secondary battery applied in a sealing apparatus for a secondary battery according to an embodiment of the present invention, and FIG. 4 is a front view showing a state in which a secondary battery is pressed by a sealing apparatus for a secondary battery according to an embodiment of the present invention.

Referring to FIGS. 1 to 4, a sealing apparatus 100 for a secondary battery according to an embodiment of the present invention is a sealing apparatus 100 that seals a battery case 11 to manufacture a secondary battery 10, and comprises a pair of sealing blocks 130 for pressing an outer circumferential surface 11d of the battery case 11 and a heating unit 140 provided in the pair of sealing blocks 130 and heating the pair of sealing blocks 130. The pair of sealing blocks 130 comprise lead sealing regions E1 and E2 for pressing a lead sealing portion P1 of the battery case 11 and case sealing regions C1 and C2 for pressing a case sealing portion P2 of the battery case 11.

Hereinafter, the sealing apparatus for a secondary battery according to an embodiment of the present invention will be described in more detail.

The sealing apparatus 100 for a secondary battery according to an embodiment of the present invention seals the battery case 11, which accommodates an electrode assembly 12 therein, to manufacture the secondary battery 10.

Referring to FIGS. 2 and 3, the secondary battery 10 may comprise an electrode lead 13 which is connected to the electrode assembly 12 and extended to the outside of the battery case 11.

The electrode assembly 12 is a chargeable and dischargeable power generating element having a structure in which electrodes and separators are alternately stacked and bound.

The electrodes may comprise positive electrodes and negative electrodes. Also, the positive electrodes and the negative electrodes are separated by the separators and electrically insulated from each other.

An accommodation portion 11c may be formed inside the battery case 11 to accommodate the electrode assembly 12.

Also, the battery case 11 may comprise an upper case 11b and a lower case 11a.

In addition, the battery case 11 may be closed by sealing outer circumferential surfaces 11d which are edges of the upper case 11b and the lower case 11a.

Also, referring to FIGS. 1 and 3, the battery case 11 may comprise a lead sealing portion P1 in which the electrode lead 13 is located in a pressing direction at the outer circumferential surface 11d and a case sealing portion P2 in which only the battery case 11 is located.

Here, in the lead sealing portion P1, the electrode lead 13 may be located between the battery case 11 and the battery case 11 in the pressing direction. That is, the upper case 11b, the lower case 11a of the battery case 11, and the electrode lead 13 between the upper case 11b and the lower case 11a may be provided in the lead sealing portion P1.

Also, in the case sealing portion P2, only the battery case 11 may be located without the electrode lead 13 in the pressing direction. That is, the upper case 11b and the lower case 11a of the battery case 11 may be provided in the case sealing portion P2.

Referring to FIGS. 1, 3, and 4, the pair of sealing blocks 130 may press and seal the outer circumferential surface 11d of the battery case 11. Here, in portions in four directions of the outer circumferential surface 11d of the battery case 11 on a plan view, the pair of sealing blocks 130 may press and seal portions in directions in which the electrode lead 13 is locate. Here, for example, electrode leads 13 are located on both sides of the battery case 11, and the pair of sealing blocks 130 may seal both the side portions of the outer circumferential surface 11d of the battery case 11.

Also, pressing surfaces of the pair of sealing blocks 130 may have shapes corresponding to the outer surfaces of the battery case 11.

Also, the pair of sealing blocks 130 may comprise the lead sealing regions E1 and E2 for pressing the lead sealing portion P1 of the battery case 11 and the case sealing regions C1 and C2 for pressing the case sealing portion P2 of the battery case 11.

Meanwhile, the pair of sealing blocks 130 may press the lead sealing portion P1 and the case sealing portion P2 of the battery case 11 at different pressures.

Here, for example, the pair of sealing blocks 130 may press the lead sealing portion P1 and the case sealing portion P2 of the battery case 11 at the same pressure. Accordingly, the outer circumferential surface 11d of the battery case 11 may be uniformly pressed and sealed.

Meanwhile, for another example, the pair of sealing blocks 130 may press the lead sealing portion P1 of the battery case 11 at a higher pressure than the case sealing portion P2. Accordingly, a more firm seal may be made between the battery case 11 and the electrode lead 13 of the battery case 11. Therefore, the more firm sealing quality may be provided to enhance reliability of the secondary battery 10.

Moreover, the pair of sealing blocks 130 may comprise an upper sealing block 110 located above the battery case 11 and a lower sealing block 120 located below the battery case 11.

Each of the upper sealing block 110 and the lower sealing block 120 may be formed in a shape divided into the lead sealing regions E1 and E2 and the case sealing regions C1 and C2. Here, the upper sealing block 110 may comprise an upper case block 111 that forms an upper part of the case sealing regions C1 and C2 and an upper lead block 112 that forms an upper part of the lead sealing regions E1 and E2.

The lower sealing block 120 may comprise a lower case block 121 that forms a lower part of the case sealing regions C1 and C2 and a lower lead block 122 that forms a lower part of the lead sealing regions E1 and E2.

Meanwhile, referring to FIG. 1, the sealing apparatus 100 for a secondary battery according to an embodiment of the present invention may further comprise a moving unit 160 that moves the pair of sealing blocks 130.

The moving unit 160 may comprise, for example, a pneumatic or hydraulic pressure actuator.

Also, the moving unit 160 may comprise an upper moving unit for moving the upper sealing block 110 and a lower moving unit for moving the lower sealing block 120.

Here, the upper moving unit may comprise an upper case moving unit 163 for moving the upper case block 111 and an upper lead moving unit 161 for moving the upper lead block 112.

Also, the lower moving unit may comprise a lower case moving unit 164 for moving the lower case block 121 and a lower lead moving unit 162 for moving the lower lead block 122.

Also, referring to FIG. 4, when the lead sealing portion P1 of the battery case 11 is pressed by moving the upper lead block 112 and the lower lead block 122 through the upper lead moving unit 161 and the lower lead moving unit 162, a stronger pressing force may be applied, rather than when the case sealing portion P2 of the battery case 11 is pressed by moving the upper case block 111 and the lower case block 121 through the upper case moving unit 163 and the lower case moving unit 164.

Referring to FIGS. 1 and 4, the heating unit 140 may be provided in the pair of sealing blocks 130 and heat the pair of sealing blocks 130.

The heating unit 140 may comprise case sealing heaters 143 and 144 located at the case sealing regions C1 and C2 in the pair of sealing blocks 130 and lead sealing heaters 141 and 142 located at the lead sealing regions E1 and E2.

The heating unit 140 may heat the lead sealing regions E1 and E2 and the case sealing regions C1 and C2 of the pair of sealing blocks 130 at different temperatures.

Here, the heating unit 140 may perform heating such that the temperatures of the lead sealing regions E1 and E2 are higher than the temperatures of the case sealing regions C1 and C2 in the pair of sealing blocks 130. Accordingly, the temperatures of the lead sealing regions E1 and E2 may be prevented from becoming relatively lower than the temperatures of the case sealing regions C1 and C2 due to the heat loss by the electrode lead 13.

Here, the heating unit 140 may heat the case sealing regions C1 and C2 and the lead sealing regions E1 and E2 of the pair of sealing blocks 130 such that the temperatures of the case sealing portion P2 and the lead sealing portion P1 of the battery case 11 become uniform when the battery case 11 is pressed.

Thus, in order for the temperatures of the case sealing portion P2 and the lead sealing portion P1 in the battery case 11 to become uniform when the battery case 11 is sealed, the heating unit 140 may perform heating such that the temperatures of the lead sealing regions E1 and E2 are higher than the temperatures of the case sealing regions C1 and C2 in the pair of sealing blocks 130. Thus, the uniform sealing quality may be ensured.

That is, when the battery case 11 is pressed while applying heat thereto, the heat loss occurs at the electrode lead 13, and the temperature of the lead sealing portion P1 becomes locally lower. The lead sealing portion P1 is heated at a higher temperature corresponding to the occurrence of the heat loss, and thus, a predetermined temperature may be achieved. Thus, through this method, the temperatures of the lead sealing portion P1 and the case sealing portion P2 become uniform, and as a result, the uniformity of sealing and the quality may be enhanced.

Sealing Apparatus for a Secondary Battery According to Another Embodiment

Hereinafter, a sealing apparatus for a secondary battery according to another embodiment will be described.

Figure 5:
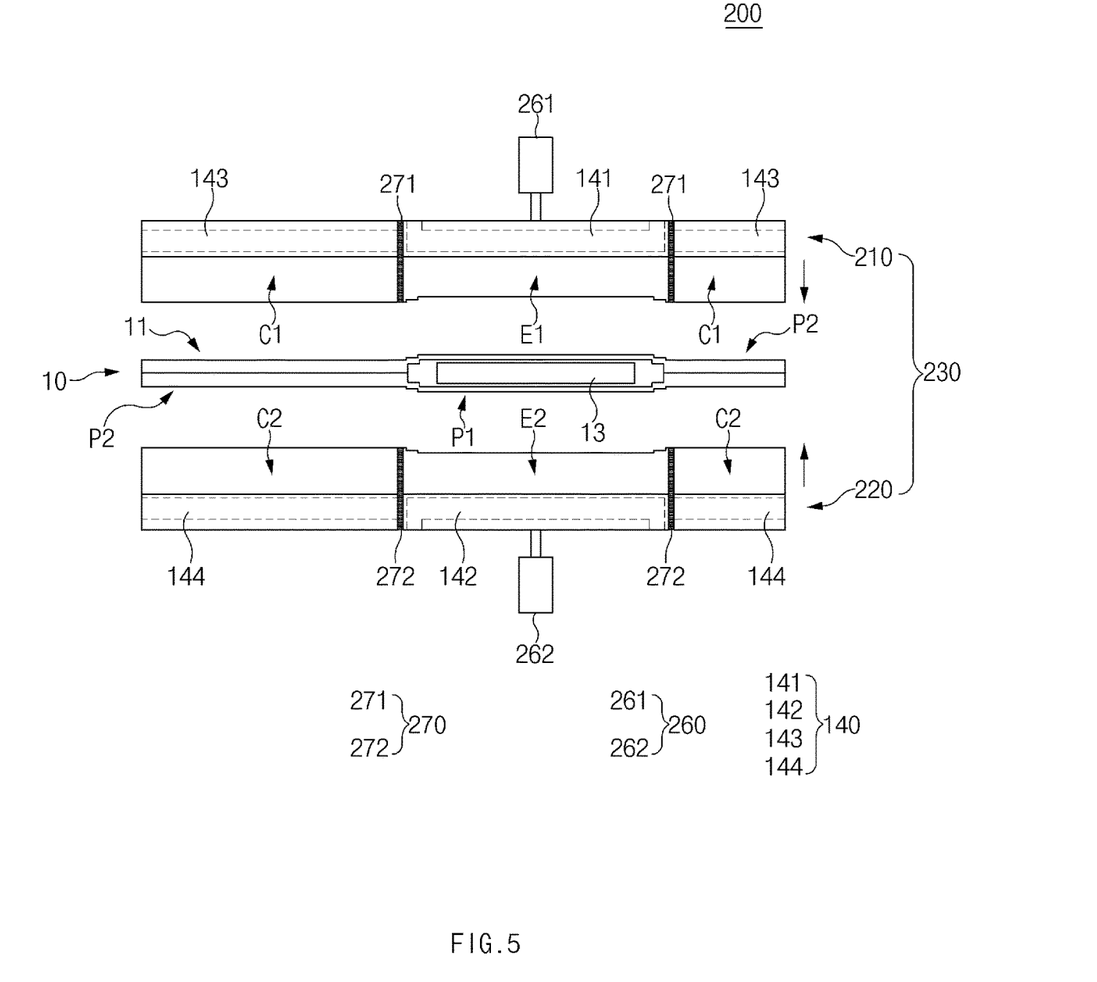
FIG. 5 is a front view exemplarily showing a sealing apparatus for a secondary battery according to another embodiment of the present invention.
Figure 6:
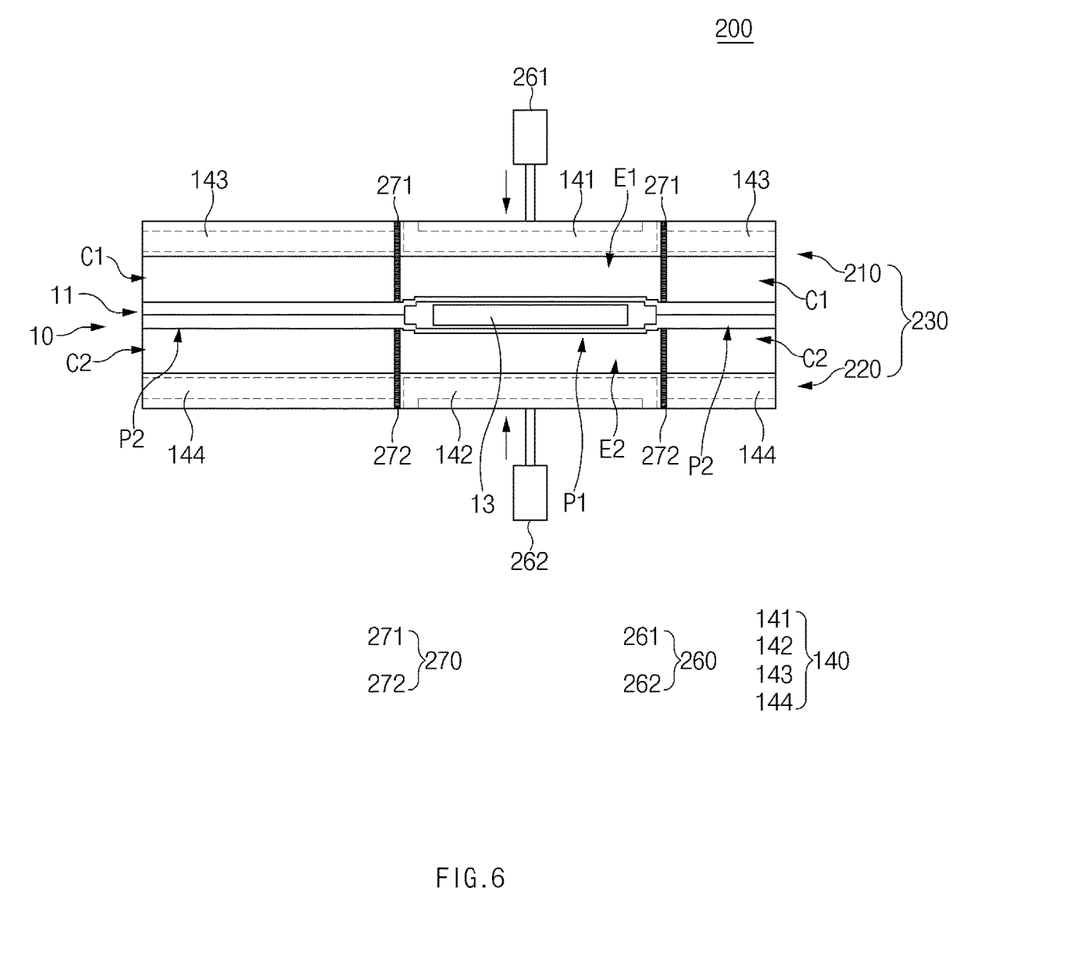
FIG. 6 is a front view showing a state in which a secondary battery is pressed by a sealing apparatus for a secondary battery according to another embodiment of the present invention.

FIG. 5 is a front view exemplarily showing a sealing apparatus for a secondary battery according to another embodiment of the present invention, and FIG. 6 is a front view showing a state in which a secondary battery is pressed by a sealing apparatus for a secondary battery according to another embodiment of the present invention.

Referring to FIGS. 5 and 6, a sealing apparatus 200 for a secondary battery according to another embodiment of the present invention is a sealing apparatus 200 that seals a battery case 11 to manufacture a secondary battery 10, and comprises a pair of sealing blocks 230 for pressing an outer circumferential surface of the battery case 11 and a heating unit 140 provided in the pair of sealing blocks 230 and heating the pair of sealing blocks 230. The pair of sealing blocks 230 comprise lead sealing regions E1 and E2 for pressing a lead sealing portion P1 of the battery case 11 and case sealing regions C1 and C2 for pressing a case sealing portion P2 of the battery case 11.

The sealing apparatus 200 for a secondary battery according to another embodiment of the present invention is different from the sealing apparatus for a secondary battery according to the embodiment of the present invention described above in that each of upper and lower sealing blocks 220 in the pair of sealing blocks 230 is formed as a single body. Thus, the current embodiment will be described with a focus on the differences from the foregoing embodiment, and duplicated descriptions will be omitted and briefly described.

Referring to FIGS. 2, 3, and 5, the sealing apparatus 200 for a secondary battery according to another embodiment of the present invention seals the battery case 11, which accommodates an electrode assembly 12 therein, to manufacture the secondary battery 10.

The secondary battery 10 may comprise an electrode lead 13 which is connected to the electrode assembly 12 and extended to the outside of the battery case 11.

An accommodation portion 11c may be formed inside the battery case 11 to accommodate the electrode assembly 12.

Also, the battery case 11 may comprise an upper case 11b and a lower case 11a.

In addition, the battery case 11 may be closed by sealing outer circumferential surfaces 11d which are edges of the upper case 11b and the lower case 11a.

Also, the battery case 11 may comprise a lead sealing portion P1 in which the electrode lead 13 is located in a pressing direction at the outer circumferential surface 11d and a case sealing portion P2 in which only the battery case 11 is located.

Here, in the lead sealing portion P1, the electrode lead 13 may be located between the battery case 11 and the battery case 11 in the pressing direction. That is, the upper case 11b, the lower case 11a of the battery case 11, and the electrode lead 13 between the upper case 11b and the lower case 11a may be provided in the lead sealing portion P1.

Also, in the case sealing portion P2, only the battery case 11 may be located without the electrode lead 13 in the pressing direction. That is, the upper case 11b and the lower case 11a of the battery case 11 may be provided in the case sealing portion P2.

Referring to FIGS. 3, 5, and 6, the pair of sealing blocks 230 may press and seal the outer circumferential surface 11d of the battery case 11. Here, in portions in four directions of the outer circumferential surface 11d of the battery case 11 on a plan view, the pair of sealing blocks 230 may press and seal portions in directions in which the electrode lead 13 is locate. Here, for example, electrode leads 13 are located on both sides of the battery case 11, and the pair of sealing blocks 230 may seal both the side portions of the outer circumferential surface 11d of the battery case 11.

Also, pressing surfaces of the pair of sealing blocks 230 may have shapes corresponding to the outer surfaces of the battery case 11.

Also, the pair of sealing blocks 230 may comprise the lead sealing regions E1 and E2 for pressing the lead sealing portion P1 of the battery case 11 and the case sealing regions C1 and C2 for pressing the case sealing portion P2 of the battery case 11.

Moreover, for example, the pair of sealing blocks 230 may press the lead sealing portion P1 and the case sealing portion P2 of the battery case 11 at the same pressure. Accordingly, the outer circumferential surface 11d of the battery case 11 may be uniformly pressed and sealed.

Meanwhile, for another example, the pair of sealing blocks 230 may press the lead sealing portion P1 and the case sealing portion P2 of the battery case 11 at different pressures. Here, the pair of sealing blocks 230 may press the lead sealing portion P1 of the battery case 11 at a higher pressure than the case sealing portion P2. Accordingly, a more firm seal may be made between the battery case 11 and the electrode lead 13 of the battery case 11. Here, the pressing surfaces of the pair of sealing blocks 230 may have shapes corresponding to the outer surfaces of the battery case 11, and the pressing surfaces of the lead sealing regions E1 and E2 are formed closer to the outer surfaces of the battery case 11 than are the pressure surfaces of sealing regions. Thus, the lead sealing portion P1 of the battery case 11 may be easily pressed at a higher pressure than the case sealing portion P2.

Meanwhile, the pair of sealing blocks 230 may comprise an upper sealing block 210 located above the battery case 11 and a lower sealing block 220 located below the battery case 11.

Each of the upper sealing block 210 and the lower sealing block 220 may be formed as a single body. Here, each of the upper sealing block 210 and the lower sealing block 220 may further comprise heat insulators 270 that block heat transfer between the case sealing regions C1 and C2 and the lead sealing regions E1 and E2. Accordingly, through the heating unit 140, the lead sealing regions E1 and E2 may be easily heated at a higher temperature than the case sealing regions C1 and C2.

The heat insulators may comprise an upper heat insulator 271 provided in the upper sealing block 210 and a lower heat insulator 272 provided in the lower sealing block 220.

Meanwhile, the sealing apparatus 200 for a secondary battery according to another embodiment of the present invention may further comprise a moving unit 260 that moves the pair of sealing blocks 230.

The moving unit 260 may comprise, for example, a pneumatic or hydraulic pressure actuator.

Also, the moving unit 260 may comprise an upper moving unit 261 for moving the upper sealing block 210 and a lower moving unit 262 for moving the lower sealing block 220.

The heating unit 140 may be provided in the pair of sealing blocks 230 and heat the pair of sealing blocks 230.

The heating unit 140 may comprise case sealing heaters 143 and 144 located at the case sealing regions C1 and C2 in the pair of sealing blocks 230 and lead sealing heaters 141 and 142 located at the lead sealing regions E1 and E2.

The heating unit 140 may heat the lead sealing regions E1 and E2 and the case sealing regions C1 and C2 of the pair of sealing blocks 230 at different temperatures.

Here, the heating unit 140 may perform heating such that the temperatures of the lead sealing regions E1 and E2 are higher than the temperatures of the case sealing regions C1 and C2 in the pair of sealing blocks 230.

Here, the heating unit 140 may heat the case sealing regions C1 and C2 and the lead sealing regions E1 and E2 of the pair of sealing blocks 230 such that the temperatures of the case sealing portion P2 and the lead sealing portion P1 of the battery case 11 become uniform when the battery case 11 is pressed.

Thus, in order for the temperatures of the case sealing portion P2 and the lead sealing portion P1 of the battery case 11 to become uniform when the battery case 11 is sealed, the heating unit 140 may perform heating such that the temperatures of the lead sealing regions E1 and E2 are higher than the temperatures of the case sealing regions C1 and C2 in the pair of sealing blocks 230. Thus, the uniform sealing quality may be ensured. Here, the heat insulators 270 are provided between the case sealing regions C1 and C2 and the lead sealing regions E1 and E2, and thus, when the case sealing regions C1 and C2 and the lead sealing regions E1 and E2 in the pair of sealing blocks 230 are heated through the case sealing heaters 143 and 144 and the lead sealing heaters 141 and 142, the temperatures of the lead sealing regions E1 and E2 may be easily maintained at a higher temperature than the case sealing regions C1 and C2. Accordingly, the more uniform sealing quality may be ensured.

Although the present invention has been described in detail through the specific embodiments, these are intended to specifically describe the present invention, and the present invention is not limited thereto. Various modifications can be made within the technical idea of the present invention by those with ordinary skill in the art.

Also, the specific protection scope of the invention can become apparent from the appended claims.

DESCRIPTION OF THE SYMBOLS

10: Secondary battery
11: Battery case
11a: Lower case
11b: Upper case
11c: Accommodation portion
11d: Outer circumferential surface
12: Electrode assembly 13: Electrode lead
100,200: Sealing apparatus
110,210: Upper sealing block
111: Upper case block
112: Upper lead block
120,220: Lower sealing block
121: Lower case block
122: Lower lead block
130,230: Pair of sealing blocks
140: Heating unit
141,142: Lead sealing heaters
143,144: Case sealing heaters
160,260: Moving unit
161: Upper lead moving unit
162: Lower lead moving unit
163: Upper case moving unit
164: Lower case moving unit
261: Upper moving unit
262: Lower moving unit
270: Heat insulator
271: Upper heat insulator
272: Lower heat insulator
C1, C2: Case sealing regions
E1, E2: Lead sealing regions
P1: Lead sealing portion
P2: Case sealing portion

The invention claimed is:

1. A sealing apparatus for a secondary battery, the sealing apparatus configured to seal a battery case of the secondary battery with an electrode assembly therein, the sealing apparatus comprising:
    a pair of sealing blocks configured to simultaneously press an entirety of an outer circumferential surface of the battery case; and
    a heating unit provided in the pair of sealing blocks, the heating unit being configured to heat the pair of sealing blocks,
    wherein the pair of sealing blocks comprise:
    lead sealing regions configured to press a lead sealing portion of the outer circumferential surface of the battery case in which an electrode lead connected to the electrode assembly extends to an outside of the battery case; and
    case sealing regions configured to press a case sealing portion of the outer circumferential surface of the battery case which is a remainder of the battery case outside of the lead sealing portion that does not have the electrode lead extending therethrough,
    wherein the case sealing regions include a first portion adjacent to a first side of the lead sealing regions and a second portion adjacent to a second side of the lead sealing regions, the first portion having a larger surface area than the second portion,
    wherein the heating unit is configured to heat the lead sealing regions and the case sealing regions of the pair of sealing blocks at different temperatures.

2. The sealing apparatus of claim 1, wherein the heating unit is configured to perform heating such that temperatures of the lead sealing regions are higher than temperatures of the case sealing regions in the pair of sealing blocks.

3. The sealing apparatus of claim 2, wherein the heating unit is configured to heat the case sealing regions and the lead sealing regions of the pair of sealing blocks such that the temperatures of the case sealing portion and the lead sealing portion of the battery case become uniform when the battery case is pressed.

4. The sealing apparatus of claim 1, wherein the pair of sealing blocks are configured to press the lead sealing portion and the case sealing portion of the battery case at different pressures.

5. The sealing apparatus of claim 1, wherein the pair of sealing blocks are configured to press the lead sealing portion of the battery case at a higher pressure than the case sealing portion.

6. The sealing apparatus of claim 1, wherein the pair of sealing blocks are configured to press the lead sealing portion and the case sealing portion of the battery case at a same pressure.

7. The sealing apparatus of claim 1, wherein the heating unit comprises:
    case sealing heaters located at the case sealing regions of the pair of sealing blocks; and
    lead sealing heaters located at the lead sealing regions of the pair of sealing blocks.

8. The sealing apparatus of claim 1, wherein the pair of sealing blocks comprise an upper sealing block configured to be located above the battery case and a lower sealing block configured to be located below the battery case, each of the upper sealing block and the lower sealing block is formed as a respective single body, and each of the upper sealing block and the lower sealing block further comprises a heat insulator that blocks heat transfer between the case sealing regions and the lead sealing regions of the respective sealing block.

9. The sealing apparatus of claim 1, wherein the pair of sealing blocks comprise an upper sealing block configured to be located above the battery case and a lower sealing block configured to be located below the battery case, and each of the upper sealing block and the lower sealing block is divided into the lead sealing regions and the case sealing regions of the respective sealing block.

10. The sealing apparatus of claim 9, wherein the upper sealing block comprises an upper case block that forms an upper part of the respective case sealing regions and an upper lead block that forms an upper part of the respective lead sealing regions, and the lower sealing block comprises a lower case block that forms a lower part of the respective case sealing regions and a lower lead block that forms a lower part of the respective lead sealing regions.

* * * * *